United States Patent
Barragan

(10) Patent No.: US 10,148,760 B2
(45) Date of Patent: Dec. 4, 2018

(54) RAILROAD CROSSING WARNING SYSTEM

(71) Applicant: John E Barragan, Melbourne, FL (US)

(72) Inventor: John E Barragan, Melbourne, FL (US)

(*) Notice: Subject to any disclaimer, the term of this patent is extended or adjusted under 35 U.S.C. 154(b) by 187 days.

(21) Appl. No.: 15/248,778

(22) Filed: Aug. 26, 2016

(65) Prior Publication Data

US 2016/0362122 A1    Dec. 15, 2016

(51) Int. Cl.
  *B61L 9/04* (2006.01)
  *B61L 29/02* (2006.01)
  *B61L 29/30* (2006.01)
  *H04L 29/08* (2006.01)
  *B61L 9/00* (2006.01)

(52) U.S. Cl.
  CPC .............. *H04L 67/12* (2013.01); *B61L 29/30* (2013.01); *B61L 9/04* (2013.01); *B61L 29/02* (2013.01)

(58) Field of Classification Search
  CPC ....... B61L 23/00; B61L 23/041; G08B 13/18; G08B 13/181; G08B 13/183; G08B 13/16; G08B 13/164
  See application file for complete search history.

(56) References Cited

U.S. PATENT DOCUMENTS

| 6,806,811 B1 | 10/2004 | Readler |
| 2005/0194423 A1 | 9/2005 | Okita |
| 2013/0194423 A1 | 8/2013 | Baines et al. |

*Primary Examiner* — Jason C Smith
(74) *Attorney, Agent, or Firm* — Jason T. Daniel, Esq.; Daniel Law Offices, P.A.

(57) ABSTRACT

A railroad crossing warning system includes a beam emitter for generating a focused beam of energy, and a receiver for receiving the focused beam of energy. A pair of weatherproof housings secures the emitter and receiver diagonally at a railroad intersection. A base station is communicatively linked to the beam emitter and the receiver, and a base station communication unit transmits an obstruction warning to an approaching train.

15 Claims, 6 Drawing Sheets

RAILROAD CROSSING WARNING SYSTEM

TECHNICAL FIELD

The present invention relates generally to railroad safety systems, and more particularly to a railroad system that can warn approaching trains of obstacles on the railroad tracks at a road crossing.

BACKGROUND

The statements in this section merely provide background information related to the present disclosure and may not constitute prior art.

As shown in background FIG. 1, a railroad crossing 1 is a location where railroad tracks 2 on which a train 3 travels, intersects a road 4 on which automobiles 5 travel. Railroad crossings are typically fitted with some type of warning device to alert automobiles that a train is approaching the crossing. These systems typically include active mechanisms such as a pair of railroad crossing gates 6 which are deployed along the road on each side of the tracks. As such, when a train approaches, the gate arms 6a lower, and a set of flashing lights 6b and alarm bells 6c are activated.

Regardless of such warning systems the National Highway Traffic Safety Administration reported over 2,000 collisions between trains and automobiles in 2015 alone. In the vast majority of these cases, the train operator had no warning that an obstruction existed at an upcoming crossing, and therefore had no opportunity to stop or reduce the speed of the train prior to impact.

Accordingly, it would be beneficial to provide a railroad crossing warning system which can warn approaching trains of an obstruction to the railroad tracks at a vehicle crossing location so as to provide the train operator time to slow or stop thereby preventing a crash.

SUMMARY OF THE INVENTION

The present invention is directed to a railroad crossing warning system. One embodiment of the present invention can include a beam emitter and a receiver that function to send and receive a focused beam of energy. The emitter and receiver can be placed at the railroad intersection, preferably along new or existing crossing gates. The system can also include a base station which can be communicatively linked to the beam emitter and the receiver. The base station including a communication unit that can transmit an obstruction warning to an approaching train upon receiving an instruction from the emitter and receiver that the generated beam is not being received by the receiver.

Another embodiment of the present invention can include a pre-recorded voice message indicating the location of the intersection where the obstruction is located.

Yet another embodiment of the present invention can include freestanding beam emitter and receiver that can be positioned at railroad crossings where no crossing gates are located. Such a system can further include a solar power unit capable of providing the necessary power requirements to each system component.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
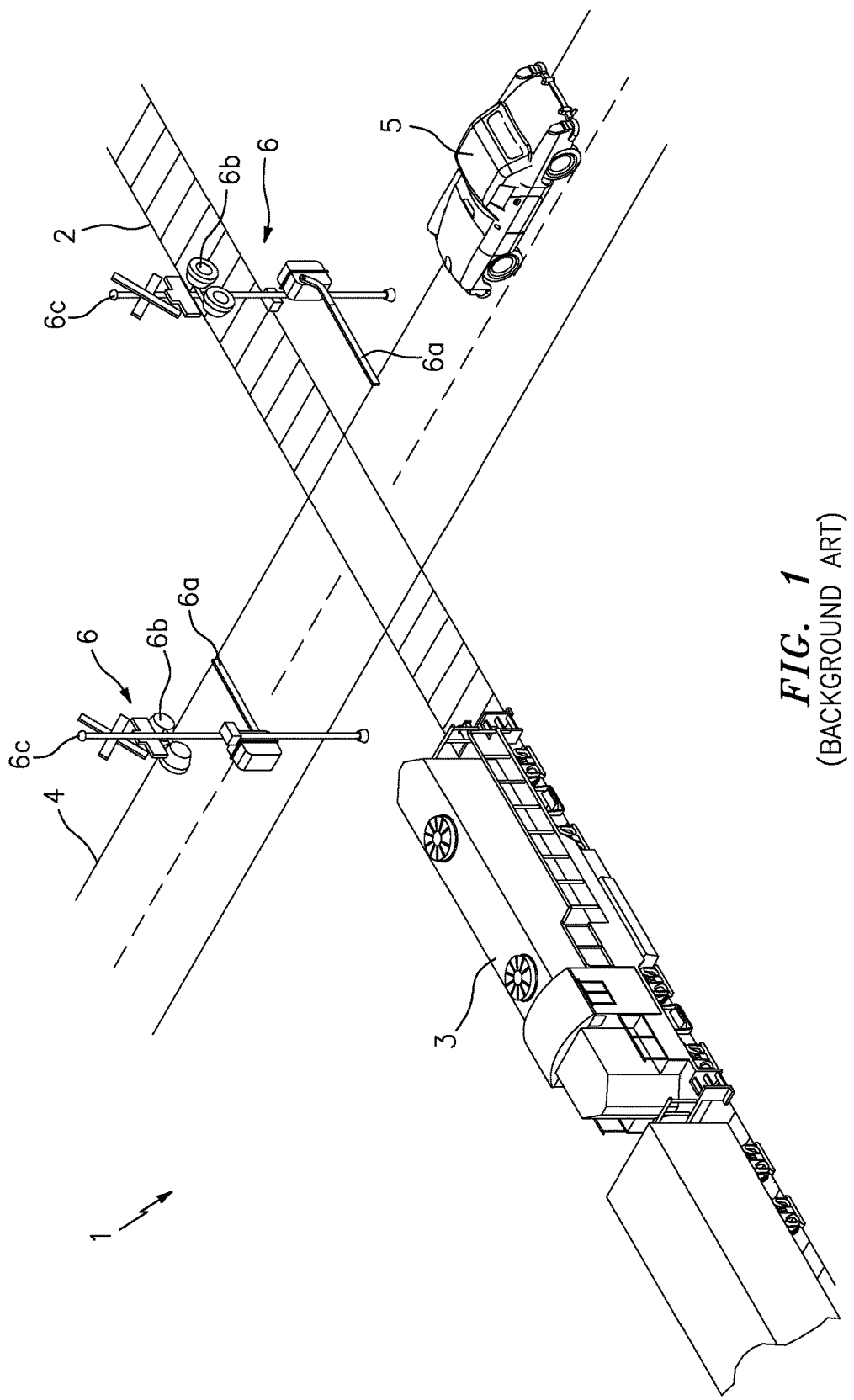
FIG. 1 is a perspective view of a railroad crossing in accordance with background art that is useful for understanding the inventive concepts disclosed herein.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

FIGS. 2A-5 illustrate various embodiments of a railroad crossing warning system 100 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 2A.

As described throughout this document, the railroad crossing warning system 100 can function to identify a vehicle or other obstruction that is located on the railroad 2 of the intersection 1, and can transmit an obstruction alert to an approaching train 3.

Figure 2A:
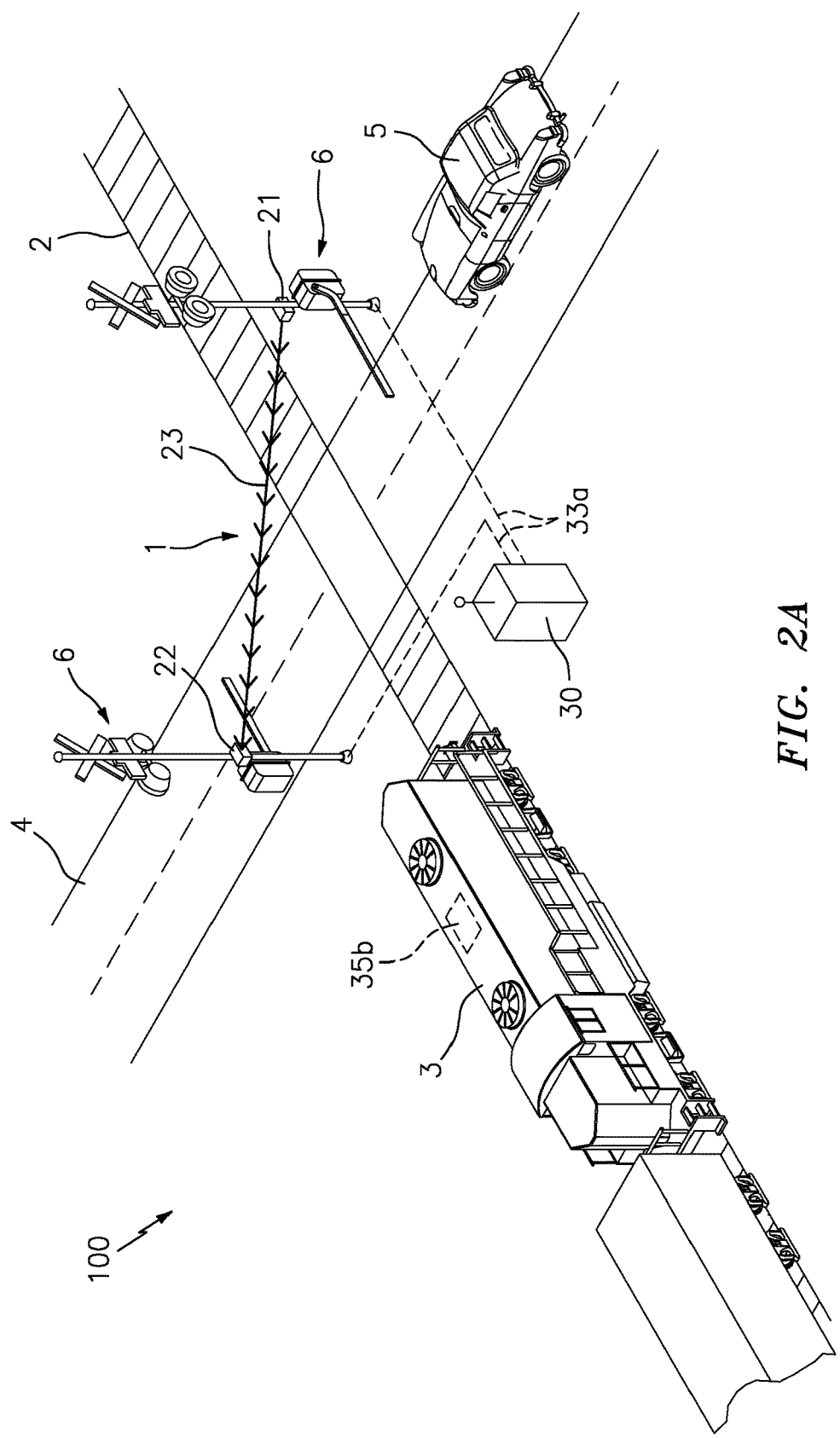
FIG. 2A is a perspective view of the railroad warning system in operation, in accordance with one embodiment of the invention.

As shown in FIG. 2A, one embodiment of the system 100 can include at least one beam emitter 21, a receiver 22, and a base station 30. As described herein, the beam emitter(s) 21 can include any type of device that is capable of transmitting a focused beam of invisible and/or visible energy 23 at distances of between at least 15 and 50 feet, for example. Several nonlimiting examples include various lasers and/or infrared beams, for example. The beam emitter can be in communication with the base station to report an operating status.

The receiver 22 can include any type of device that can receive and detect the presence of the focused beam that is generated by the beam emitter. The receiver can be in communication with the base station to report a beam reception status. This information can include, for example, a notification to the base station indicating that the receiver has power, but is not receiving the beam from the emitter.

As noted above, any number of known emitter/receiver combinations can be utilized to generate a focused beam across the intersection of the railroad track. Such systems are well known in the art, and include, for example those described in U.S. Pat. No. 6,806,811, to Readler, the contents of which are incorporated herein by reference. Of course, the present system 100 is not to be construed as limiting to any particular type of component for generating and/or receiving the beam, as any type of known break-beam system can be utilized herein. Several variants include the transmitter to transmitter variety, transmitter reflector variety and/or the dual transmitter/receiver to transmitter/receiver variety.

Figure 2B:
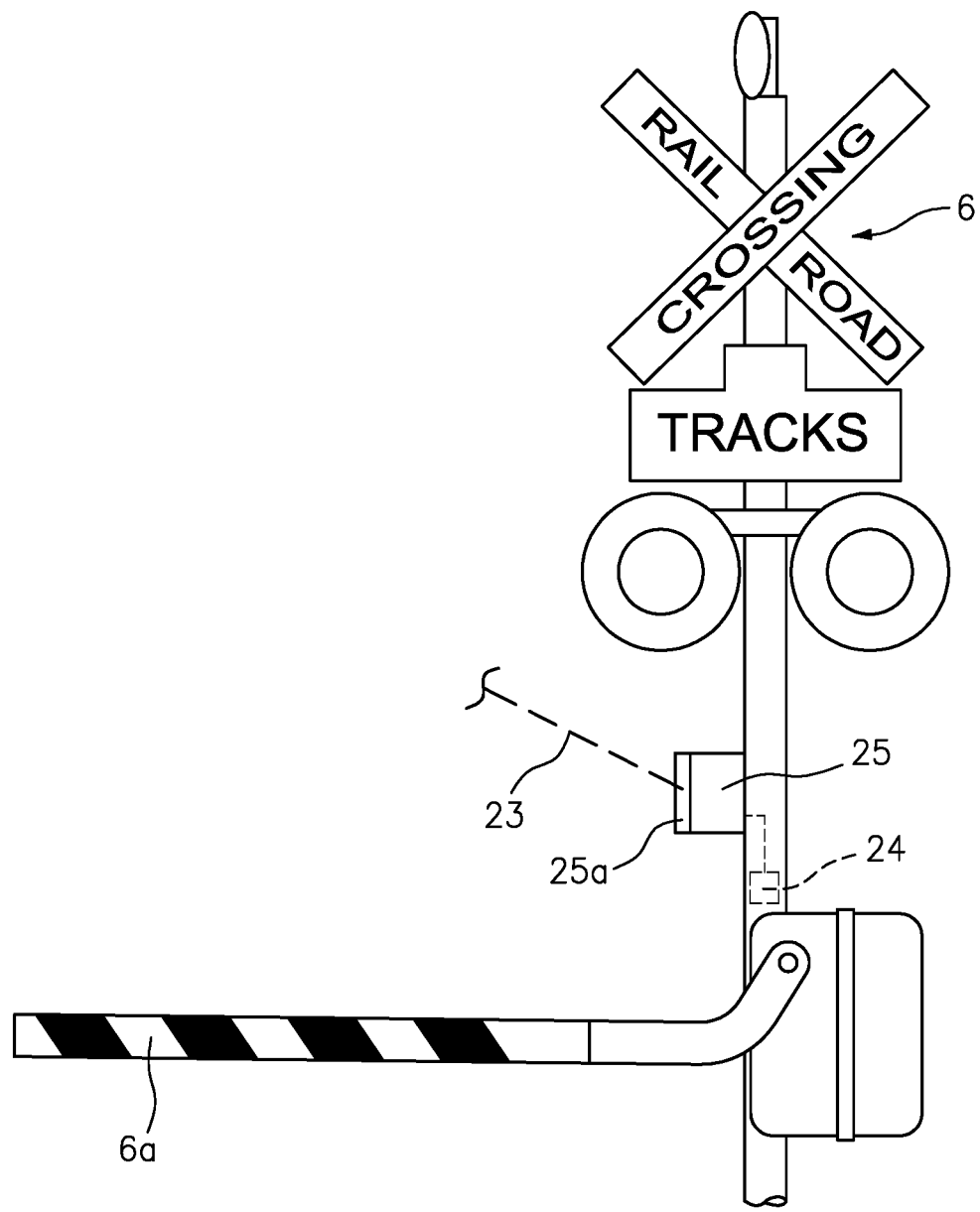
FIG. 2B is a perspective view of the weatherproof housing of the railroad warning system, in accordance with one embodiment of the invention.

As shown in cutout FIG. 2B, the beam emitter and the receiver can each preferably be positioned within a weatherproof housing 25 (e.g., resistant to moisture and dirt), having a first surface 25a through which the beam 23 can pass. The housing can be secured along the existing railroad crossing gates 6 or can be formed as an integral component of a new crossing gate 6, so as to allow the inventive concepts to be seamlessly incorporated into such systems moving forward.

The emitter and receiver can preferably be electrically connected to the respective crossing gate so as to receive electrical power therefrom when the gate arm 6a is between approximately 45 degrees and the fully lowered position. Such a feature can be accomplished in accordance with known methodologies via an electrical contact switch 24 or other known mechanism that is installed between the emitter/receiver, the gate arm, and the gate power source, for example.

In either instance, the emitter and receiver can be aligned so as to ensure the beam 23 from the emitter 21 extends across the intersection 1 where the railroad tracks 2 and the road 4 meet, and is then received by the receiver 22. In this regard, it is preferred that the emitter 21 and receiver 22 be positioned so that the beam is located between approximately 2 and 4 feet above the ground. Such a height being sufficient to prevent an obtrusion alarm from being generated in the event that trash or other small debris is located on the tracks when the system is activated. Of course, other embodiments are contemplated wherein the beam and emitter are located at different locations and/or at different heights from the ground.

Figure 3:
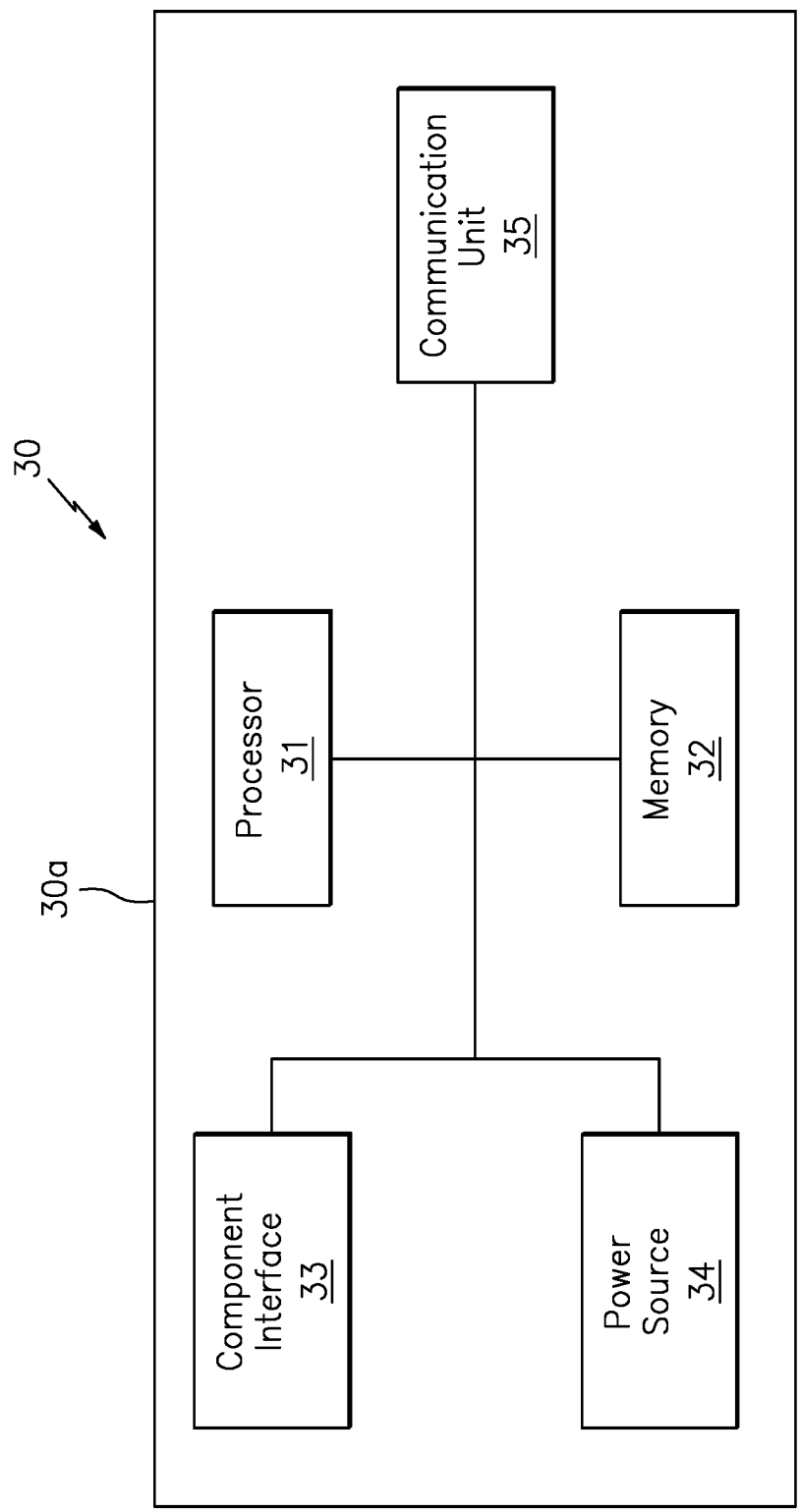
FIG. 3 is a simplified block diagram of the base station of the railroad warning system, in accordance with one embodiment of the invention.

The base station 30 can be linked to, and control the operation of, the emitter 21 and receiver 22. As shown in FIG. 3, the base station 30 can include a main body 30a having a processor 31 that is connected to an internal memory 32, a component interface 33, a power source 34, and a communication unit 35.

Although illustrated as separate elements, those of skill in the art will recognize that one or more system components may comprise, or include one or more printed circuit boards (PCB) containing any number of integrated circuit or circuits for completing the activities described herein. The CPU may be one or more integrated circuits having firmware for causing the circuitry to complete the activities described herein. Of course, any number of other analog and/or digital components capable of performing the below described functionality can be provided in place of, or in conjunction with the below described controller elements.

The main body 30a can house each of the elements of the base station in a conventional manner, so as to create a single device. In this regard, the main body 30a can take any number of different shapes and sizes, and can be constructed from any number of different materials and methods. In one preferred embodiment, the main body 30a can be constructed from a durable material such as steel, for example, that is suitable for prolonged exposure to adverse weather conditions.

The processor/CPU 31 can act to execute program code stored in the memory 32 in order to allow the device to perform the functionality described herein. Processors are extremely well known in the art, therefore no further description will be provided.

Memory 32 can act to store information and/or operating instructions in the form of program code for the processor 31 to execute. Although illustrated in FIG. 3 as a single component, memory 32 can include one or more physical memory devices such as, for example, local memory and/or one or more bulk storage devices. As used herein, local memory can refer to random access memory or other non-persistent memory device(s) generally used during actual execution of program code, whereas a bulk storage device can be implemented as a persistent data storage device such as a hard drive, for example. Additionally, memory 32 can also include one or more cache memories that provide temporary storage of at least some program code in order to reduce the number of times program code must be retrieved from the bulk storage device during execution. Each of these devices are well known in the art.

The component interface unit 33 can function to provide a communicative link between the processor 31, the emitter 21 and the receiver 22, for example. In this regard, the component interface unit can include or be connected to any number of different components such as various communication cables 33a, one or more PIC microcontrollers, USB connections and other such hardware capable of providing a direct link between the various components. Of course any other means for providing the two way communication between the identified components can also be utilized herein, such as a wireless network, for example.

The power source 34a of the base station can include any number of different components capable of allowing the base station to be connected to a commercial electric grid. Of course, the base station can also include any number of other components such as one or more batteries capable of operating the unit. Moreover, in various embodiments, the system can also include one or more solar panels 34a that are capable of providing the necessary power requirements to each component of the system (See FIG. 5).

The communication unit 35 can include any number of different components that are capable of communicating with an external device either directly or over a network. In one embodiment, the communication unit can include a variable radio wave transmitter having a radio frequency chip capable of transmitting a plurality of independent radio frequencies 35a, that can be stored in the memory 32.

In the preferred embodiment, the communication unit can be configured to broadcast an obstruction warning on a particular radio channel/frequency such as 900.5 Hz., for example, which is exclusively reserved for trains, and to which the commercial radio on the train is tuned at all times. Moreover, the output power of the broadcast can be relatively low so as to reduce the distance at which a train can receive the signal. For example, the broadcast can have a transmission range of anywhere between approximately 0.1 and 0.5 miles, for example, which can be achieved by individually adjusting the power level of the communication unit output based on the environmental conditions where the base station operates.

As described herein, the obstruction warning can include or comprise any type of audible and/or visual alert to be presented to the operator of the train. For example, the obstruction warning can include an alarm sound and/or a pre-recorded voice message stating the name of the railroad crossing 1, and an indication that an obstruction is currently located on the track, which can be played on the train radio. Such a message can be stored within the memory 33.

Although described above as utilizing a radio frequency that can be received on a standard train radio, other embodiments are also contemplated. For example, each train can also be fitted with a receiver 35b which can receive the obstruction warning 35a and present a visual and/or audible warning to the train operation. One such example of a suitable receiver can include a variable radio wave receiver having a radio frequency chip capable of receiving a specific radio frequency 35a. Of course, any number of other types of transmission and reception devices and protocols are also contemplated. Moreover, the receiver 35b can also include or comprise an onboard speed control system (cab signal system) which can function to automatically slow/stop the train upon receipt of the obstruction warning.

Figure 4:
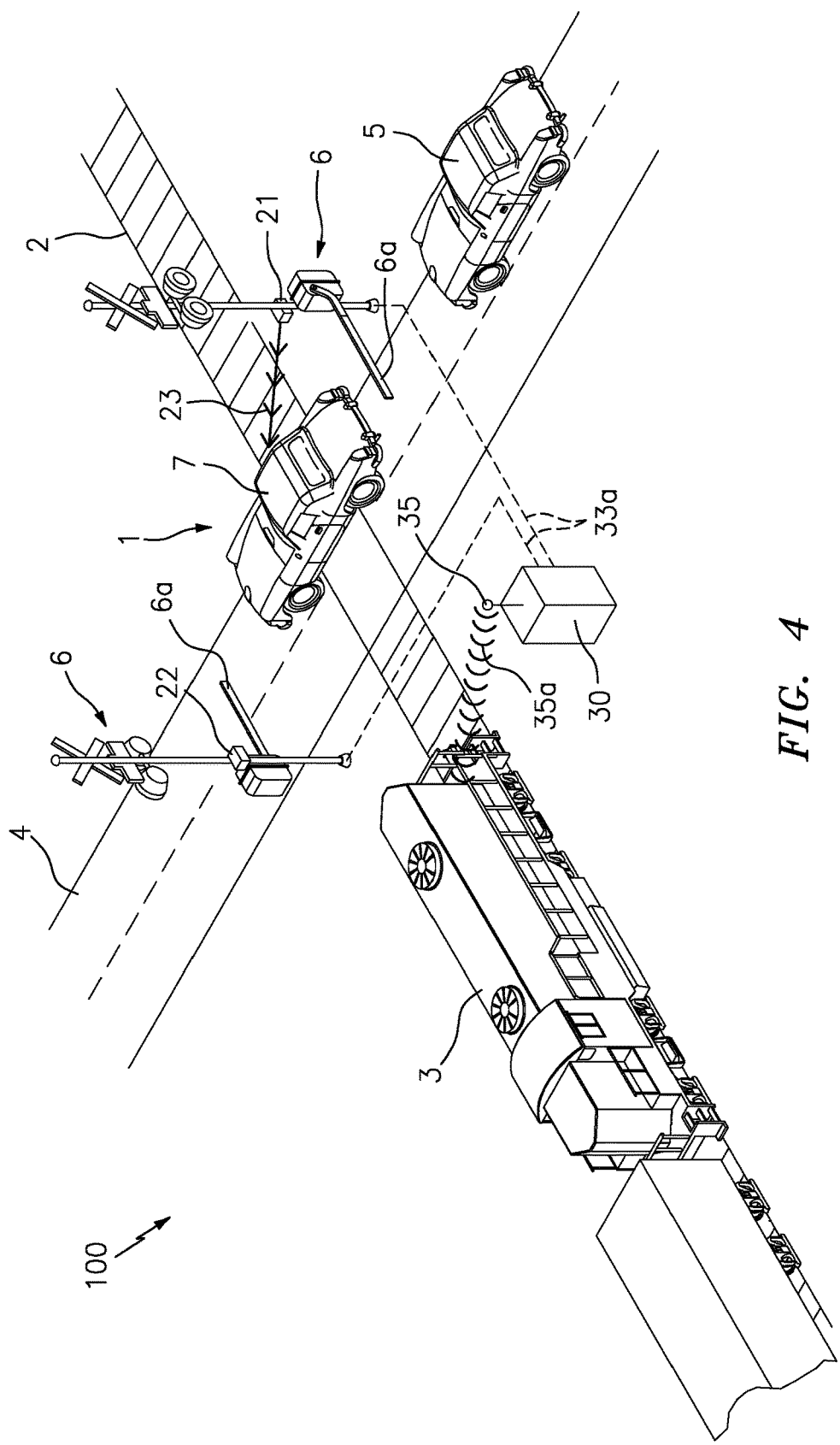
FIG. 4 is another perspective view of the railroad warning system in operation, in accordance with one embodiment of the invention.

FIG. 4 illustrates one embodiment of the system 100 in operation. As shown, the system can function to transmit an obstruction warning 35a to an approaching train 3 when an obstruction 7 on the track 2 breaks the beam 23.

In order to prevent false alarms from the system, it is preferred that the obstruction warning can only be transmitted when the base station receives a signal from both the beam emitter 21 and the receiver 22. For example, when electrical power is supplied to the emitter 21, the same can provide a continuous signal to the base station 30 that the beam 23 is being generated. However, when electrical power is supplied to the receiver 22, the same will only provide a signal to the base station when the beam 23 is not being received, thereby indicating an obstruction in the road.

As noted above, electrical power is preferably supplied to the beam emitter and receiver only when the gate to which they are attached is in the down position. As such, the system is advantageously designed to not operate in instances where the gates are malfunctioning, thereby preventing instances of sending false obstruction warnings.

Figure 5:
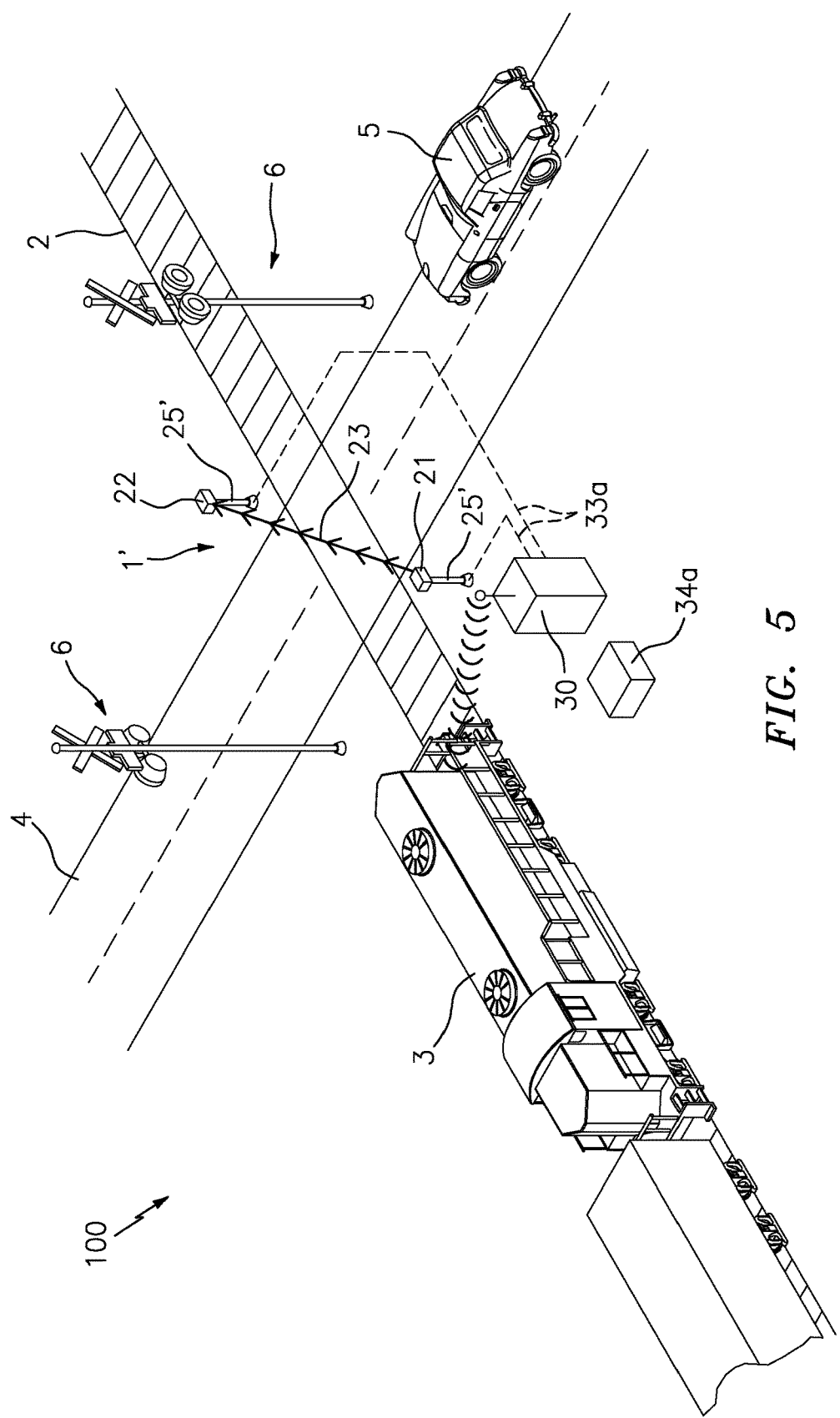
FIG. 5 is a perspective view of the railroad warning system in operation, in accordance with another embodiment of the invention.

FIG. 5 illustrates another embodiment of the system 10 for use at rural crossings 1', wherein no powered gates may be available. In such an embodiment, the base station can be connected to the electrical grid (if available) or can include the above described solar panel, so as to generate sufficient power for the entire system. As shown, the beam emitter 21 and the receiver 22 can be positioned within a freestanding housing 25' that can be secured into the ground and located diagonally to the intersection. Each of the beam emitter and receiver can preferably be powered by the base station via one or more cables 33a, for example. The system can operate in substantially the same manner as above, except the beam emitter will preferably be in the on position at all times. As such, when the beam is not received by the receiver 22, the base station will broadcast the obstruction warning.

As described herein, one or more elements of the railroad crossing warning system 100 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individual elements such as the beam emitter 21 or the receiver 22, for example, can be formed as a part of the base station 30, for example, so as to reduce the total number of components to two.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the terms "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A railroad crossing warning system for use at railroad crossings, said system comprising:
   a beam emitter that is configured to generate a focused beam of energy;
   a receiver that is configured to receive the focused beam of energy; and
   a base station that is in communication with each of the beam emitter and the receiver,
   said base station including functionality for determining that the focused beam of energy is not being received by the receiver, and for broadcasting an obstruction warning upon the determination
   wherein each of the beam emitter and the receiver are configured to be electrically connected to one of a pair of crossing gates, and to receive electrical power when an arm of the respective crossing gate is in a down position.

2. The system of claim 1, wherein the focused beam of energy includes a laser signal.

3. The system of claim 1, wherein the focused beam of energy includes an infrared signal.

4. The system of claim 1, further comprising:
   a first waterproof housing having an interior space for receiving the beam emitter;

a second waterproof housing having an interior space for receiving the receiver;

each of the first and second waterproof housings including a surface for allowing the focused beam of energy to pass therethrough.

5. The system of claim 4, wherein each of the first and second waterproof housings include a crossing gate connector for mating with a pair of the crossing gates at a railroad intersection.

6. The system of claim 1, wherein the base station comprises:

a memory for storing instructions;

a component interface for communicating with the beam emitter and receiver; and a communication unit for communicating wirelessly with an external object.

7. The system of claim 6, wherein the communication unit includes a variable radio transmitter that is configured to broadcast an audible alert at a first frequency and for a first distance.

8. The system of claim 7, wherein the first distance is between approximately 0.1 and 0.5 miles.

9. A railroad crossing warning system for use at railroad crossings, said system comprising:

a first freestanding weatherproof housing having a clear surface along one end;

a second freestanding weatherproof housing having a clear surface along one end;

a beam emitter that is configured to generate a focused beam of energy, said beam emitter being located within the first freestanding housing;

a receiver that is configured to receive the focused beam of energy, said receiver being located within the second freestanding housing; and a base station that is in communication with each of the beam emitter and the receiver, and including a memory for storing instructions, a component interface for communicating with the beam emitter and the receiver; and a communication unit for communicating wirelessly with an external object, said base station including functionality for determining that the focused beam of energy is not being received by the receiver, and for broadcasting an obstruction warning upon the determination, wherein the communication unit includes a variable radio transmitter that is configured to broadcast an audible alert at a first frequency and for a distance between approximately 0.1 and 0.5 miles.

10. The system of claim 9, further comprising:

a solar power unit that is configured to supply a power requirement to each of the base station, the beam emitter and the receiver.

11. The system of claim 9, wherein the focused beam of energy includes a laser signal.

12. The system of claim 9, wherein the focused beam of energy includes an infrared signal.

13. The system of claim 1, wherein the beam emitter and the receiver are positioned on opposite sides of railroad tracks.

14. The system of claim 1, wherein the moving train is approaching the base station.

15. A railroad crossing warning system for use at railroad crossings, said system comprising:

a beam emitter that is configured to generate a focused beam of energy;

a receiver that is configured to receive the focused beam of energy;

a base station that is in communication with each of the beam emitter and the receiver, said base station including functionality for determining that the focused beam of energy is not being received by the receiver, and for broadcasting an obstruction warning upon the determination:

a first waterproof housing having an interior space for receiving the beam emitter;

a second waterproof housing having an interior space for receiving the receiver;

each of the first and second waterproof housings including a surface for allowing the focused beam of energy to pass therethrough, and including a crossing gate connector for mating with a pair of crossing gates at a railroad intersection.

* * * * *